(No Model.)  3 Sheets—Sheet 1.

G. N. TODD.
COTTON PICKER.

No. 271,160.  Patented Jan. 23, 1883.

WITNESSES:
Thos Houghton.
Edw. W. Byrn.

INVENTOR:
G. N. Todd
BY Munn & Co
ATTORNEYS.

(No Model.) 3 Sheets—Sheet 2.

G. N. TODD.
COTTON PICKER.

No. 271,160. Patented Jan. 23, 1883.

WITNESSES:
Thos. Houghton.
Edw. A. N. Byrn.

INVENTOR:
G. N. Todd
BY Munn
ATTORNEYS.

(No Model.)  3 Sheets—Sheet 3.

G. N. TODD.
COTTON PICKER.

No. 271,160.  Patented Jan. 23, 1883.

WITNESSES:
Thos. Houghton.
Edw. W. Byrn.

INVENTOR:
G. N. Todd
BY Munn & Co.
ATTORNEYS.

UNITED STATES PATENT OFFICE.

GEORGE N. TODD, OF LITTLE ROCK, ARKANSAS.

COTTON-PICKER.

SPECIFICATION forming part of Letters Patent No. 271,160, dated January 23, 1883.

Application filed December 23, 1882. (No model.)

*To all whom it may concern:*

Be it known that I, GEORGE N. TODD, of Little Rock, in the county of Pulaski and State of Arkansas, have invented a new and useful Improvement in Cotton-Pickers; and I do hereby declare that the following is a full, clear, and exact description of the same, reference being had to the accompanying drawings, forming part of this specification.

The object of my invention is to provide a light serviceable cotton-picker, which may be operated by being pushed by hand over the row of plants, and which shall be of such low relative cost as to be within the reach of all cotton-growers. These ends I aim to accomplish by the organization which I will now proceed to describe.

Figure 1:
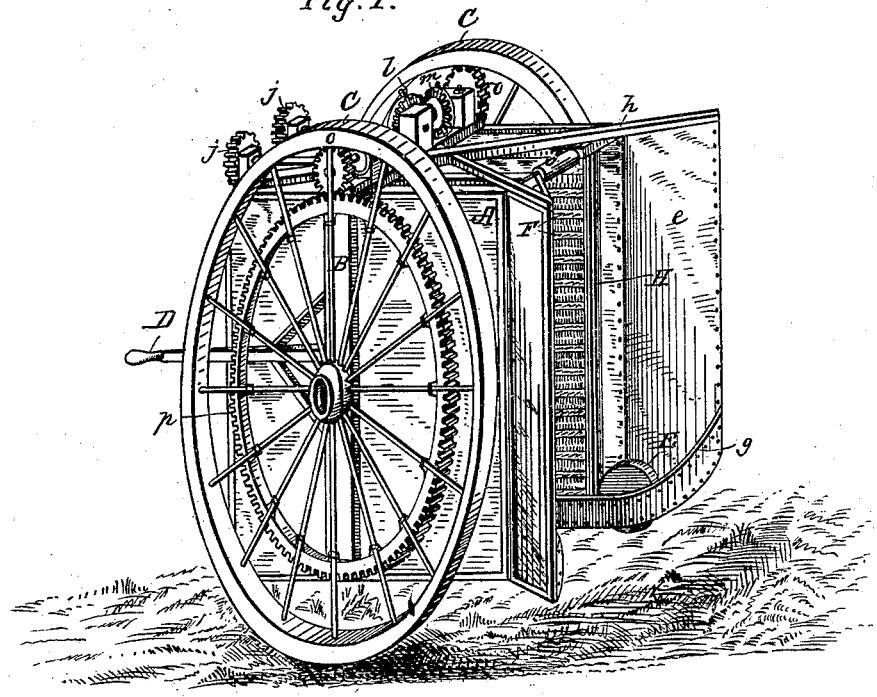
Figure 2:
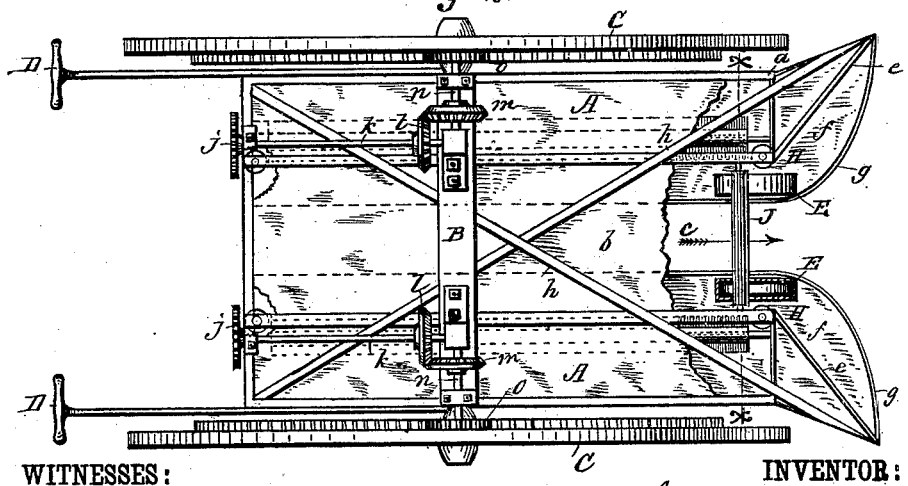
Figure 3:
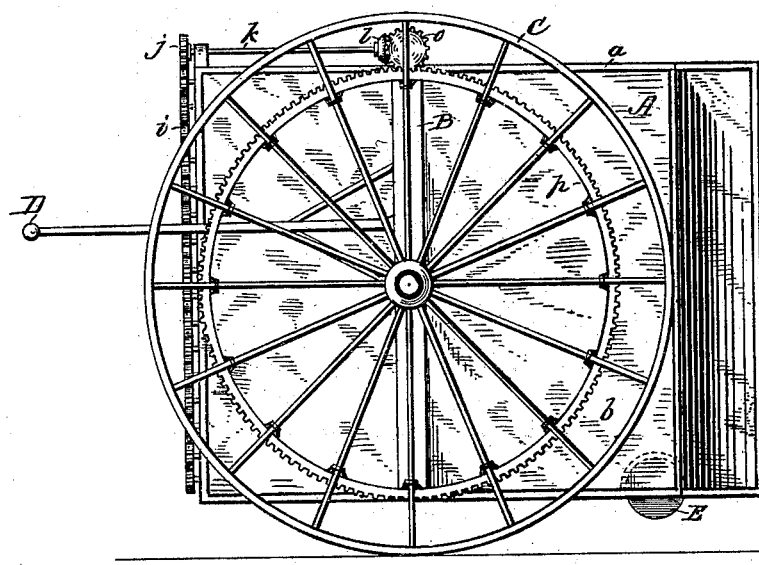
Figure 4:
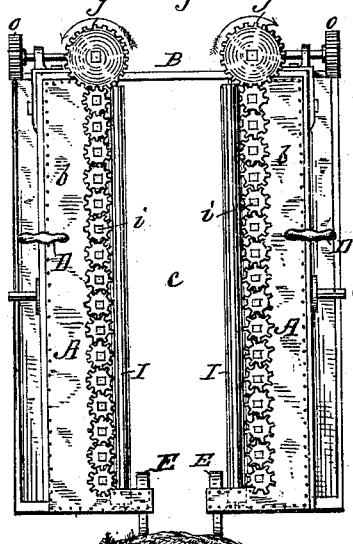
Figure 5:
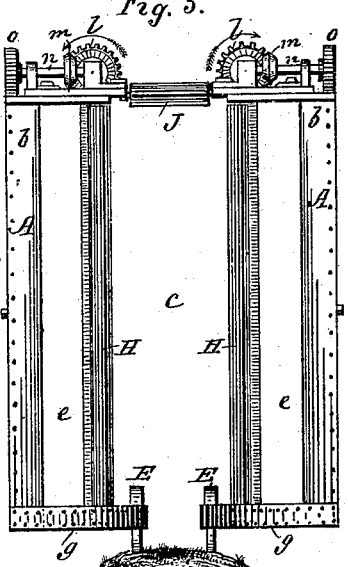
Figure 6:
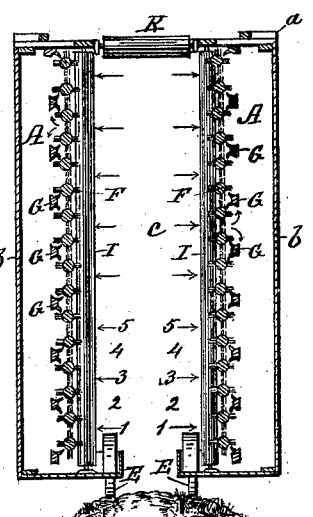
Figure 7:
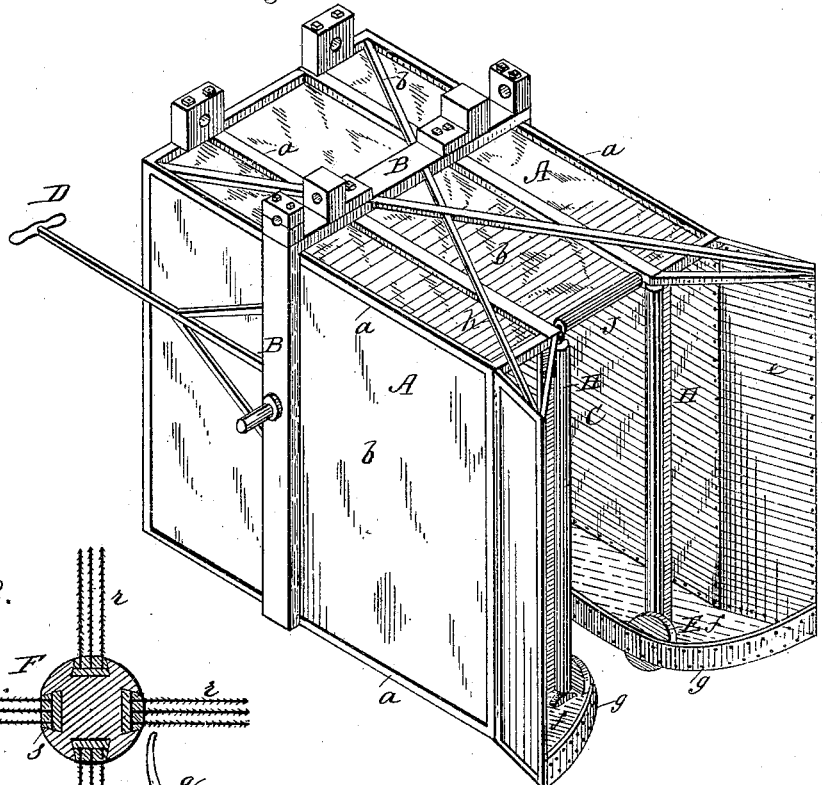

Figure 1 is a perspective view of the entire machine. Fig. 2 is a top or plan view with the front part of the inclosure, partly broken away. Fig. 3 is a side elevation. Fig. 4 is a rear end elevation. Fig. 5 is a front end elevation. Fig. 6 is a vertical cross-section. Fig. 7 is a perspective view of the case of the machine with the other parts detached; and Fig. 8 is an enlarged sectional detail, showing the relation of a pair of picker-cylinders to the stripper which removes the cotton from said cylinders.

In these figures, A A represents the body of the machine, which is a light skeleton frame, $a$, covered by canvas or cotton ducking, $b$. This frame has exactly similar sides, and is constructed with inclined converged or hopper-shaped front ends, faced with canvas or ducking, $e\ e$, which lead into a central passage-way, $c$, that extends entirely through the machine. These converging front ends serve to guide the cotton-bushes into the middle passage-way as the machine is pushed along the row, in which middle passage-way the cotton is stripped from the bolls by devices hereinafter described. At the bottom of the converging front ends of the case is a platform, $f$, around whose edge is a marginal wall or guard-strip, $g$, to retain any over-ripe bolls of cotton that may fall off the bush when it strikes said inclined faces of the front portion of the case.

The case is suitably braced by cross-rods $h\ h$ on top, and is attached to and supported upon the crank-axle B, which passes over the top of the frame and down upon the two sides, upon which sides it is provided with journals that are supported upon the running wheels C C. Upon these wheels the weight of the machine is sustained as it is pushed forward over the row by the rearwardly-projecting handles D, the front end being provided with rollers E E, that rest upon the cotton-row to guide and steady the machine as it moves along.

Figure 8:
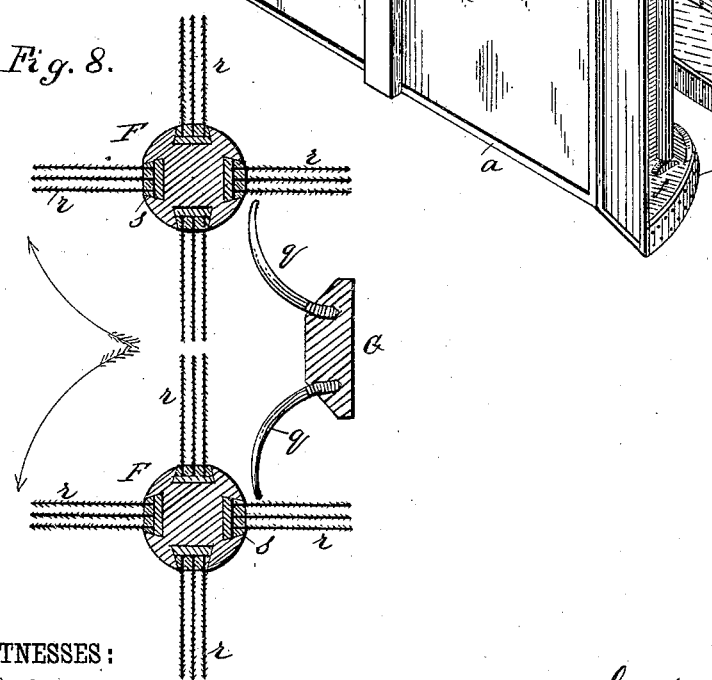

The picking devices consist of a series of cylinders or rollers, F, Figs. 1, 6, and 8, arranged horizontally on each side of the passage-way $c$, and one above the other to the height of about four feet. These cylinders are journaled in the vertical end bars of the main frame, and are at their rear ends connected together by gear-wheels $i\ i'$. (See Figs. 3 and 4.) These gear-wheels are driven from the top by gears $j\ j$ on shafts $k\ k$, (see Fig. 2,) which at their forward ends carry bevel-wheels $l\ l$, that engage with other bevel-wheels, $m\ m$, on short transverse shafts $n\ n$, which latter have at their outer ends pinions $o\ o$, which engage with the large gears $p\ p$, fixed to the sides of the two main supporting-wheels. It will be seen, therefore, that as the machine is pushed forward the cylinders are made to rotate through the gears just described. These picking-cylinders are so armed with picking devices as to seize the cotton and pull it from the boll, and they operate, by reason of their gears, in pairs, pulling the cotton in at 1 3 5 in Fig. 6, while at the alternating points 2 4, &c., the cylinders have a motion in the opposite directions. As the cotton is pulled in between any two pairs of cylinders it is stripped therefrom by the strippers, which are in the nature of horizontal bars G, with hooked-shaped teeth $q\ q$, of which one set curve upward for one cylinder, while the other set curve downward for the other or lower cylinder, the cotton falling in the spaces within the case behind the strippers, as shown in Fig. 6.

Fig. 8 shows in enlarged view the construction and relation of one set of cylinders and their strippers. These strippers have their supporting-bars fixed rigidly in the end frames of the case, and occupy a position between the two cylinders, where their peripheries commence to turn to the passage-way $c$ again.

These cylinders are formed of a central core with rows of teeth r r, having spines or gaffs formed upon their sides, adapted to seize and hold the cotton, which teeth are seated in strips of rubber, s, that are inserted in dovetail grooves in the core of the cylinder, and which rubber base allows the teeth to spring aside when they strike a green boll without doing any damage to the same.

At the front end of the series of picking-cylinders are vertical passively-moving guard-rollers H H, which serve to guide the bushes from the inclined throat into the passage-way and avoid wear, while at the rear of the passage-way, upon each side, are corresponding vertical rollers, I I, which guide the bushes past the gear-wheels. Horizontal rollers J and K are also arranged at the top of the passage-way at the front and rear for the same purpose of guiding the bushes and preventing wear.

The machine sets directly over the cotton-row, the two power and carrying wheels being between the rows, while the two small wheels in front rest directly on the cotton-bed, running by the sides of the cotton-bushes.

The machine is pushed by two men, each using the handle on his side and going down his middle of the row, thus pushing the machine directly against and over the cotton-bush, which is bent in proper form by the front inclined gatherer, and allowed easy access to the picker-walls by means of the passively-revolving upright roller-guards on each side of the entrance.

The motion of the cylinder-pickers being inward by pairs, and the natural impulse of the cotton-bush to regain its original open form, will necessarily carry the limbs or boughs of the bush through the cylinders, which in revolving will sweep all open cotton into the open space between the cylinder-wall and outer edge of the case, the walls and top of which, being cloth, (ducking,) will not break or twist the boughs during this operation.

Having once entered between the cylinders, the onward progress of the machine will carry the first bush out to the rear and against the upright roller at each end of the case, and it being there open the bush, in coming out free, will regain its original position, while its place in the machine will be occupied by other following bushes along the cotton-row. Upon coming to the end of the cotton-row, all the cotton collected in the spaces on each side of the case will be pulled to the front entrance by means of a small wooden rake and deposited in the main basket, preparatory to picking a new row.

The following are some of the advantages of my improved picker:

First. Being a light frame, whose walls and ends are covered with cotton cloth, (ducking,) it is very light and easily worked by hand, thus avoiding the knocking out and destroying of the cotton in front, as would be the case with a horse-power machine.

Second. From its peculiar formation, any cotton-bush, low or high, would be acted on by the two cylinder-walls of pickers rising from the ground upward four feet.

Third. The elasticity of the pickers, derived from their india-rubber base, would allow of a green or unopened boll of cotton going between and coming out of the cylinders without injury to it. The same elasticity would avoid breaking the bushes off and destroying the cotton-bush, therefore allowing all green bolls to open and the same bush to be picked any number of times as the different bolls might open.

Fourth. The cylinder-pickers, having steel teeth slightly barbed all around from point upward to their base, would gather and hold all cotton with which they came in contact until thrown into the open space by the steel (unbarbed) strippers setting between the alternate pairs of cylinders.

Fifth. Its cheapness of construction would place it within the reach of the small farmer as well as the large planter.

If desired, the machine may be geared so as to be worked by animal-power.

In defining my invention with greater clearness, I would state that I am aware that it is not new to construct a cotton-picker in two box-like sections with a central passage-way between, and rotary picking cylinders or reels arranged upon vertical axes at the sides of said passage-way. My invention is distinctive, in the fact that the cylinders are arranged upon horizontal axes and one above the other, and their shafts are all geared in series by a train of wheels at the rear, so that the cylinders operate in pairs, drawing in cotton at 1, 3, and 5, and not drawing in at 2 4, &c. The cotton being seized on both sides at 1 3 5, &c., it will be seen that it is more effectually removed from the bushes. A further feature of difference is the stationary horizontal strippers arranged between the pair of coacting picking-cylinders and at the point between said pairs where the peripheries of said cylinders turn toward the passage-way.

Having thus described my invention, what I I claim as new is—

1. In a cotton-picker having a central passage-way, the combination of two series of picker-cylinders arranged upon stationary horizontal axes on each side of the passage-way, the picking-cylinders in each series being geared together by a continuous train of wheels, whereby said cylinders are caused to coact in pairs on each side of the passage-way to pick cotton at the points 1 3 5, &c., substantially as and for the purpose described.

2. In a cotton-picker having a central passage-way, the combination of two series of picker-cylinders arranged upon stationary horizontal axes on each side of the passage-way, and the picking-cylinders in each series being geared together by a continuous train of wheels to cause the cylinders to operate in pairs, as described, turning in one direction at 1 3 5, &c., and in the reverse direction at 2 4, &c., and a set of stationary strippers consisting of toothed bars arranged horizontally between the pairs of picking-cylinders opposite the points where the cylinders turn toward the passage-way, as and for the purpose described.

3. The main case A, having an open passage-way through it, with inclined or tapering front walls, combined with a platform, $f$, having marginal wall $g$ to catch the bolls that are dislodged by the concussion of the machine before they have time to be seized by the pickers, as set forth.

4. The combination of the case A A, having central passage-way through it, with platform $f$ and wall $g$, the double series of picker-cylinders arranged upon horizontal axes on opposite sides of the passage-way and geared by a continuous train of wheels to rotate in pairs, the stationary horizontal strippers arranged between the pairs of cylinders opposite the points 2 4, &c., the crank-axle and supporting-wheels, and gears connecting the supporting-wheels with the train of cylinder-gears, as shown and described.

The above specification of my invention signed by me in the presence of two subscribing witnesses.

GEO. N. TODD.

Witnesses:
  EDW. W. BYRN,
  SOLON C. KEMON.